United States Patent [19]
Borden et al.

[11] Patent Number: 5,164,731
[45] Date of Patent: Nov. 17, 1992

[54] TURBULENCE RADAR SYSTEM

[75] Inventors: Scott C. Borden, Greenbelt; Bruce D. Mathews; Joseph Stevenson, both of Catonsville, all of Md.

[73] Assignee: Westinghouse Electric Corp., Pittsburgh, Pa.

[21] Appl. No.: 714,135

[22] Filed: Jun. 13, 1991

[51] Int. Cl.$^5$ ............................................. G01S 13/95
[52] U.S. Cl. ............................................................. 342/26
[58] Field of Search .......................................... 342/26

[56] References Cited

U.S. PATENT DOCUMENTS

| | | | |
|---|---|---|---|
| Re. 33,152 | 1/1990 | Atlas | 342/26 |
| 3,646,555 | 2/1972 | Atlas | 342/26 |
| 4,223,309 | 9/1980 | Payne | 342/26 |
| 4,649,388 | 3/1987 | Atlas | 342/26 |
| 4,835,536 | 5/1989 | Piesinger et al. | 342/26 |

OTHER PUBLICATIONS

Honeywell, Primus 870, Turbulence Detection Weather Radar.
ARINC Characteristic 708-5 Airborne Weather Radar, Aeronautical Radio Inc., 2551 Riva Rd., Annapolis, Md. 21401, Jan. 11, 1988.
Merrill I. Skolnik, Introduction to Radar Systems, Second Edition, pp. 498-507.

*Primary Examiner*—T. H. Tubbesing
*Attorney, Agent, or Firm*—J. K. Williamson

[57] ABSTRACT

The present invention is a radar system that detects turbulence by breaking a range cell return down into spectral segments using an FFT processor. The standard deviation of the spectrum is determined and the system compares that standard deviation to a reference threshold of a non-turbulent return if the signal is above noise. If the threshold is exceeded, the range cell is marked for turbulence display. Once the turbulence display is completed it is overlayed on the weather display. To improve matching of the feature size to the variance calculation the invention performs both range and azimuth post detection integration subsequent to the FFT but before variance calculation.

6 Claims, 3 Drawing Sheets

TURBULENCE RADAR SYSTEM

CROSS REFERENCES TO RELATED APPLICATIONS

This application is related to U.S. applications entitled Inflight Weather And Ground Mapping Radar by Bruce D. Mathews Ser. No. 714,132, Windshear Radar System with Upper and Lower Elevation Radar Scans by Bruce D. Mathews, Paul D. Montcastle and Walter W. Patterson Ser. No. 714,133, Modular Solid State Radar Transmitter by John Clarke, Joseph A. Faulkner, Gregory K. Sinon, Brian J. Misek Ser. No. 713,259, and Low Vibration Sensitivity Crystal Resonator Arrangement by Michael M. Driscoll and Norman George Mathews Ser. No. 713,260 which are concurrently filed herewith and incorporated by reference herein.

BACKGROUND OF THE INVENTION

1. Field of the Invention

The present invention is directed to a radar system that provides a visual display of turbulent weather and, more particularly, to a system that uses the spectral spread of a Doppler radar return caused by the weather turbulence to determine and display the turbulence.

2. Description of the Related Art

Areas where turbulent weather is suspected are generally avoided by commercial aircraft because the turbulent weather causes passenger discomfort and can cause accidents. When navigating through turbulent weather pilots generally try to fly the aircraft through the least turbulent areas. To this end, weather radar with turbulence displays have been provided. Such a system, as typified by U.S. Pat. No. 4,835,536, uses autocorrelation of pulse pair echoes to determine amplitude variations which are displayed. Such systems require magnatron transmitters which are large, difficult to fit in a commercial aircraft and expensive. What is needed is a method that allows a solid state Doppler radar to be used for turbulence mapping.

SUMMARY OF THE INVENTION

It is an object of the present invention to map or overlay a turbulent weather display on a conventional weather radar display.

It is another object of the present invention to map turbulence using an X-band solid state Doppler radar.

It is also an object of the present invention to map turbulent weather using the spectral spread of a range cell radar return.

It is a further object of the present invention to use coherent processing to determine the presence of turbulent weather cells.

The above objects can attained by a radar system that detects turbulence by breaking a range cell return down into its spectral segments. The system then determines the standard deviation of the spectrum and compares that standard deviation to a threshold representing the standard deviation of a non-turbulent or non-dangerous turbulence reference return. If the threshold is exceeded, the range cell is marked for turbulence display. Once the turbulence display is completed it is overlayed on a weather display.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The turbulence processing discussed herein is designed to occur in parallel with the weather processing described in the related application previously mentioned and the turbulence display is overlayed on the weather display discussed in the related application. The present invention uses coherent processing to determine the presence of dangerous turbulence in weather cells. The present invention is designed to operate whenever an adequate signal to noise ratio is available to make a reasonable determination about the presence of dangerous turbulence. The sensitivity of the present invention is based on the sensitivity time control (STC) curve supplied of the weather radar, the weather mode waveforms and the desired single pulse signal to noise ratio. It is preferred that the turbulence overlay be generated simultaneously with the radar data for the weather display. This eliminates problems in registering the weather data with the turbulence overlay that would occur if the weather turbulence data are collected on separate scan bars. The present invention is designed to operate at full performance at the conventional 40 nautical mile range scale, functions at a degraded performance level at the 80 nautical mile range scale and is not designed to function in longer range scales. It is possible to provide a separate scan used to collect turbulence data to be overlayed on the longer range scans.

Figure 1:
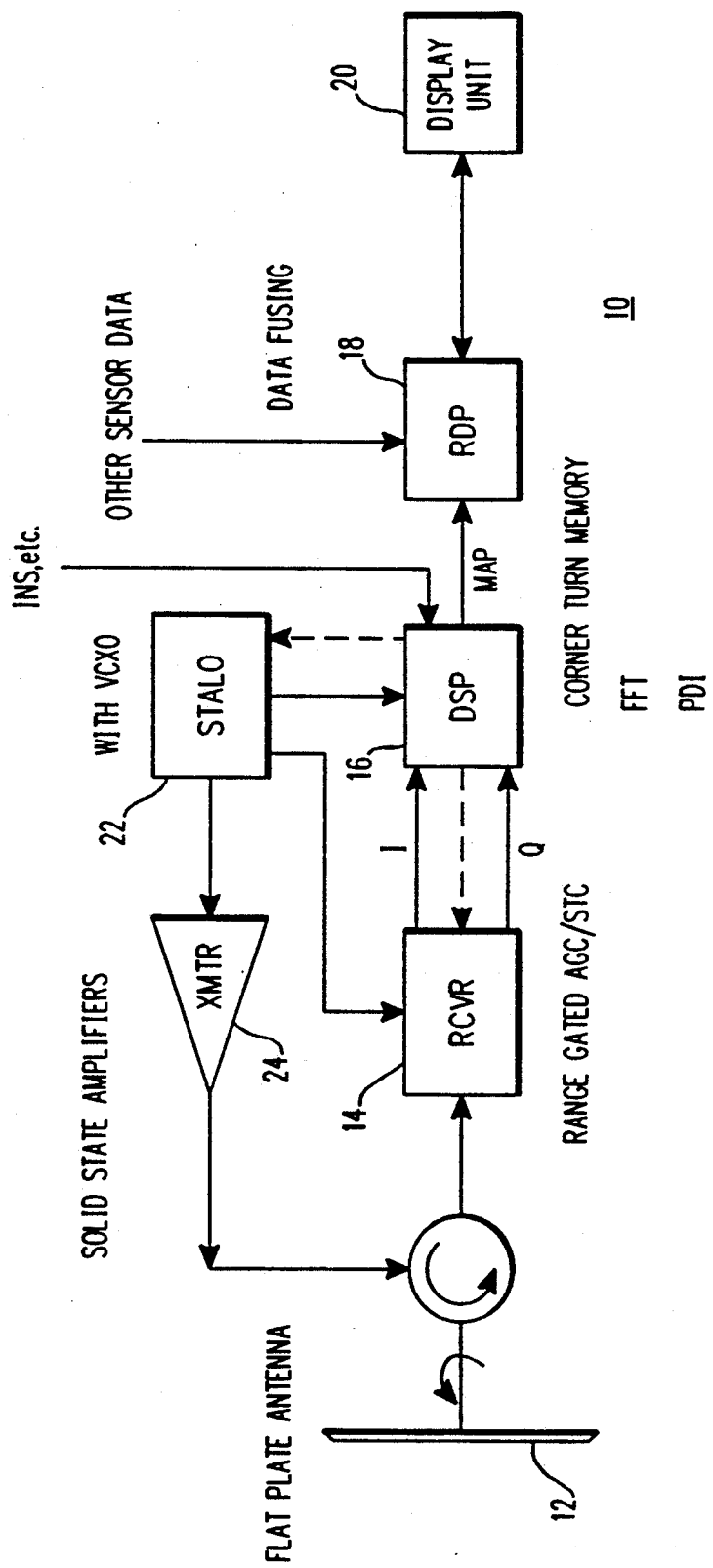
FIG. 1 illustrates the hardware of the present invention.

The present invention is designed to operate in a radar system as illustrated in FIG. 1. A conventional flat plate phased array antenna 12 provides a radar return to a receiver 14. The digital outputs by the receiver 14 are supplied to a digital signal processor 16 which provides an amplitude matrix (map) to radar data processor 18. The radar data processor 18 creates an appropriate display and overlays the weather display on display unit 20. The system includes a stabilized oscillator 22 and a transmitter 24. This radar system 10 is described in more detail in the related applications previously mentioned.

The turbulence processing of the present invention is based on the recognition that turbulence is random relative motion which causes random relative motion of the raindrops embedded within the turbulent air. This random relative motion of the raindrops causes the spectral width of a Doppler radar return to be higher than would be the case if turbulence were not present. The basic principle of operation of the present invention is to estimate the spectral width of the radar return (the energy in the return) and compare that to a threshold representing a non-turbulent return and indicate the presence of turbulence if the spectral width exceeds the threshold. The threshold is a spectrum spread of about 5 meters per second.

Figure 2:
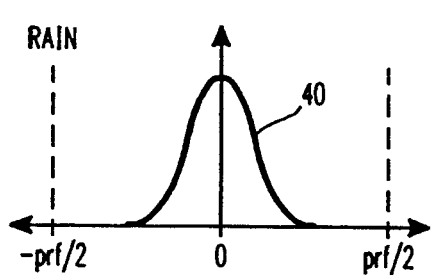
FIG. 2 depicts the spectrum of a radar return with no turbulence.
Figure 3:
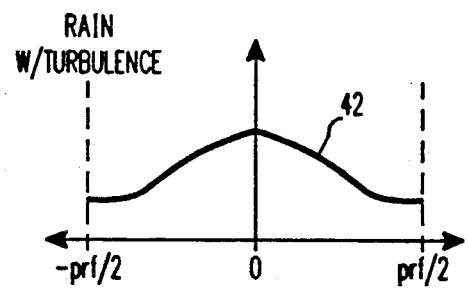
FIG. 3 illustrates the spectrum of a radar return exhibiting turbulence.

When precipitation is falling vertically, the spectrum of the received return is distributed based on the beam width, the aircraft speed, and the look angle relative to the aircraft velocity vector. A typical return spectrum 40 for non-turbulent rain is illustrated in FIG. 2 while the typical spectrum 42 of a turbulent rain return is illustrated in FIG. 3. The standard deviation of a return can be approximated by:

$$\sigma \approx \sqrt{\{\sigma_{rain}^2 + (2V\delta \sin\theta/\lambda)^2\}} \quad (1)$$

$$\approx 2/\lambda \sqrt{\{\sigma_{vr}^2 + (V\delta \sin\theta)^2\}} \quad (2)$$

where $\sigma_{rain}$ is the standard deviation of rain in $H_z$, $\sigma_{vr}$ is the standard deviation of rain in ft/sec, V is the aircraft speed in ft/sec, $\delta$ is the antenna beam width in radians ($\approx 2.5°/2\pi$), $\lambda$ is the wave length in feet (0.1 ft) and $\theta$ is the azimuth look angle ($\pm 45°$). A value for the standard deviation $\sigma$ is determined from the signal return and compared to a threshold calculated in accordance with equation (2) and if the standard deviation of the actual return exceeds the threshold, then turbulence is exists and should be noted on the weather display.

The variance of the actual signal return is calculated by performing an eight point Fast Fourier Transform (FFT) of sets of 8 pulses. Some improvement in the accuracy of this calculation can be had by using a sixteen point FFT but requires a substantial increase in memory. A four point FFT could also be used at a considerable sacrifice in accuracy. A weighted standard deviation of the energy in the FFT filter is calculated. The weight improves the accuracy of the standard deviation when $f_i$ is the frequency associated with each filter i, and $x_i$ is the energy in that filter then:

$$\sigma_f = (\Sigma(f_i x_i)^2 - (\Sigma f_i x_i)^2)/(\Sigma x_i)^2 \quad (3)$$

The maximum value of the result of equation (3) is approximately 0.17·PRF (Pulse Repetition Frequency) for the 8 pulse FFT and approaches $1/\sqrt{12}\cdot PRF$ as the number of filter segments in the FFT approaches infinity.

Figure 4:
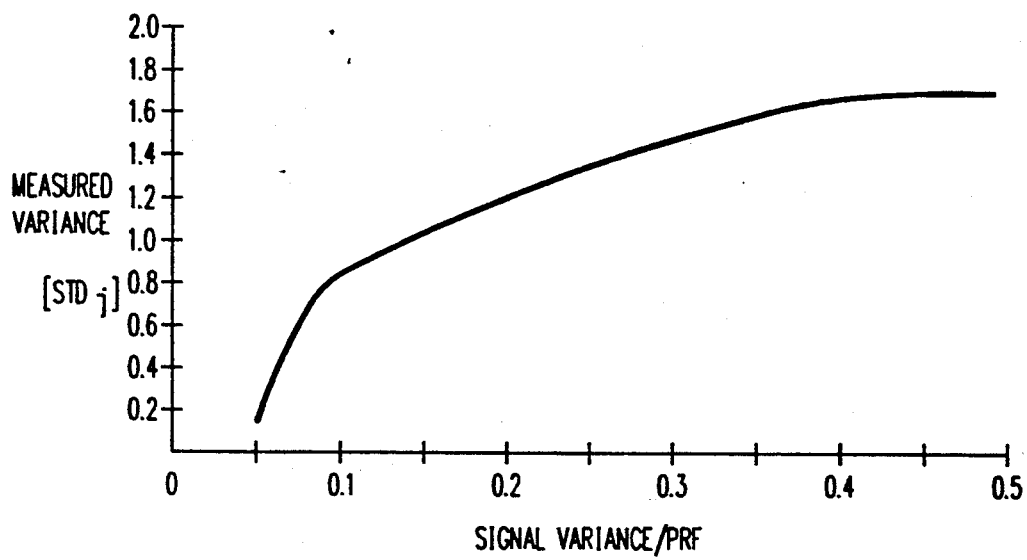
FIG. 4 is a plot of measured variance of standard deviation against the ratio of signal variance to PRF.

If the threshold is calculated based on equation (2) it is possible that the variance of the measured spectrum will never exceed the threshold because the pulse repetition frequency (PRF) is not sufficiently high to allow the spectrum to be reasonably estimated. For this reason turbulence processing is not performed on the returns from the 160, 315 and 320 nautical mile range scales and is the reason that the 80 nautical mile turbulence mode is degraded. In the 80 nautical mile range scale, the actual turbulence threshold is lower than 5 meters per second at some azimuth angles. FIG. 4 illustrates standard deviation as a function of the clutter width to PRF ratio. The section on the curve where the signal variance/PRF is less than 0.2 is the desired operating range, from 0.2 to 0.3 is a degraded operating range and greater than 0.3 is the inoperable range. The standard deviation of the signal return in the present invention is also averaged over range and coherent processing intervals to better match the processing to the expected size of the turbulence cells.

Figure 5:
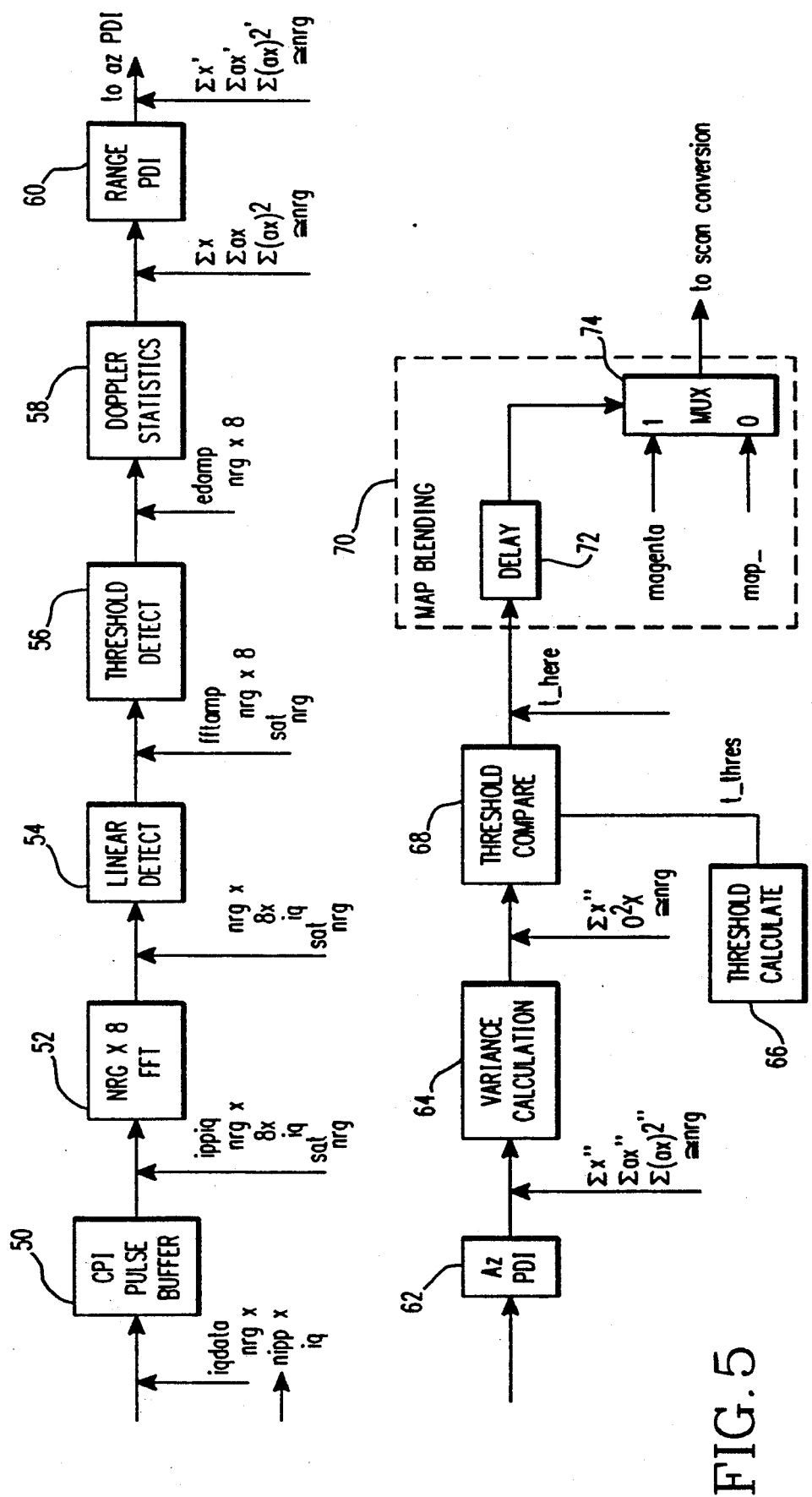
FIG. 5 depicts the process of the present invention.

FIG. 5 illustrates the processing operations performed in accordance with the present invention. The first operation is to perform coherent pulse internal (CPI) buffering 50 which includes the data input and saturation detection of the input data. The saturation detection is illustrated on page 1 of the attached Appendix, where samp is the number of samples, nrg is the number of range gates, ipp is the interpulse period, iqdata is the in-phase and quadrature phase input data and sat_thr is the saturation threshold. The pulse buffering operation 50 also includes performing a range summing also as demonstrated on page 1 of the Appendix where irg is the range gate index and sat0 and sat1 are the saturation output matrices. The process 50 then assembles groups of eight IPPs. In the 10 nautical mile and 20 nautical mile range scales, 8 IPPs can be obtained from a single look and as a result turbulence processing can occur on a look rate basis. In the 40 and 80 nautical mile range scales 2 looks are required to collect 8 interpulse periods, thus processing at a 0.5 look rate is necessary.

The system next performs an eight point FFT operation 52 which divides the energy in 8 pulses into 8 equally spaced frequency bins. A conventional 8 point FFT operation is performed and unity weights are preferably used since they provide the lowest RMS error which will minimize the calculated standard deviation of a narrow signal. Exact scaling of the FFT is not critical but it is required that the noise gain of the FFT be known since the noise gain is used in a later threshold detection operation. The system then performs a conventional linear detection operation 54 and any conventional linear detection operation which will calculate the magnitude of the complex output from the FFT is acceptable. However, the scaling is preferably unity and, if not unity, the threshold detect operation must be adjusted.

As further illustrated in FIG. 5, a threshold detection operation 56 is performed next to edit out signals which have an unacceptably low signal-to-noise ratio and to edit out signals which are saturated. The input to this operation is the linear detected amplitude matrix. Saturated signals are flagged on the weather display 20 to indicate the danger of these regions and they are set to zero since the FFT of saturated data is meaningless. The threshold detection operation is illustrated on page 2 of the Appendix. The threshold which is calculated in this operation could be calculated and stored as a constant ahead of time based on the signal-to-noise ratio and the noise gain of the FFT processing 52. The system then performs Doppler statistics calculations 58 which calculate the moments and the means of the frequency of the energy, which are used in calculating the standard deviation of the contents of the frequency bins. The input to this operation is the edited FFT amplitude data. The first step is to calculate the filter number to frequency index with seven fractional digits as depicted in the first operation on page 2 of the Appendix. This calculation can be done ahead of time and the result provided as a constant if extra speed is necessary. The second operation calculates the statistics and determines the range gate vector sum_x of the sum over the Doppler of the signal level in each Doppler bin, the range gate vector sum_ax of the sum over Doppler of the signal times the frequency in the 128'ths of a bin and the range gate vector sum_ax² of the sum over Doppler of the signal level times the frequency in the 128'ths of a bin squared.

Next, the present invention performs range post-detection integration (PDI) 60 to provide a variance calculation over more than one range gate. The inputs to the range PDI are the outputs of the Doppler statistics operation 58, plus the number of range gates over which the PDI is formed which is 3 for the 10, 20, 40 and 80 nautical mile range scales. The outputs of step 60 are the summed over in range statistics, that is, a vector rsum_x which is the sum over the Doppler with a signal level in each Doppler bin for 3 adjacent range gates, a similar vector rsum_ax of the sum over the Doppler of the signal level times the frequency in 128'ths of a bin and a similar vector rsum_ax$^2$ of the sum over Doppler of the signal level times the frequency in the 128'ths of a bin squared. The processing operations for this operation are illustrated in the Appendix on page 3. Although the present invention as described in the Appendix provides outputs transferable through vectors used for storage, it is possible to save read and write operations and memory space if the range PDI outputs are written directly into the azimuth PDI buffers.

Once the range PDI is performed, the system performs an azimuth post-detection integration operation 62 which takes the outputs of the range PDI and further sums them over beam positions. Azimuth sliding window PDI has been used in military aircraft to improve ground mapping. The details of the azimuth PDI processing as used in turbulence detection are illustrated in the attached Appendix on page 4. The outputs of the azimuth PDI is the sums over range and azimuth of the statistics. The outputs are then cycled back and used as inputs to step 62, so the outputs must not be modified. In the Appendix az_pdi is the number of beam positions in the azimuth PDI which is based on the range scale. The initial values are 6 for 10 nautical miles, 6 for 20 nautical miles, 3 for 40 nautical miles and 3 for 80 nautical miles. The intermediate values psum-x psum_ax and psum_ax2 are the range by azimuth arrays of summed signal power, the range by azimuth array of summed to signal powers times Doppler bin and the range by azimuth array of summed Doppler bins times the signal level squared. Outputs asum_x, asum_ax and asum_ax$^2$ are arrays of summed signal powers, of summed signal power times Doppler bin and summed to Doppler bin times signal level squared.

Variance processing 64 is the next operation. This calculation takes the outputs of the azimuth PDI and calculates a statistical variance of the frequency signal. This operation 64 is illustrated on page 5 of the Appendix. It should be noted that to get actual frequency variance, the output produced by the variance calculation processing in the Appendix must be divided by the sum of signal powers squared relative to the range gate. However, it is preferable that this dividing operation not be performed within the signal processor because it is time consuming and it is preferred that the process be performed by adjusting the threshold in the threshold compare operation to be discussed hereinafter.

The purpose of the threshold calculation 66 is to calculate the variance threshold to be applied to the determine the presence of turbulence. Nominally, the threshold chosen is based on 5 meters per second standard deviation turbulence, however, a different threshold could be chosen. However, at longer range gates at large azimuth angles where the PRF is too low to effectively resolve the Doppler, the threshold is lowered as long as the Doppler width of the non-turbulent air remains low compared to the threshold. The threshold calculation processing steps 66 include estimating the variance of the return due to the Doppler beamwidth, estimating the variance of the return due to the 5 meters per second turbulence, choosing the threshold and then scaling the threshold. This operation 66 is illustrated in the Appendix on page 5 where the inputs are the horizontal scan angle $\phi$, the horizontal beamwidth $\delta$ in radians where the initial value is 0.0436 radians (2.5°), the wavelength $\lambda$ of the transmitted signal (0.105 ft), V the ground speed V of the aircraft in feet per second obtained from the inertial navigation system, the PRF being used for the current waveform which can be provided from a lookup table based on the range scale selected, the threshold (no turbulence threshold) due to the Doppler beamwidth below which it is not possible to measure turbulence which is applied to the normalized Doppler beamwidth and has an initial value of $0.12^2 = 0.0144$ and the maximum allowable threshold which has an initial value of $0.15^2 = 0.0225$. The output is the variance threshold.

Once the variance calculation 64 and threshold calculation 66 are complete the threshold compare operation 68 can be performed. This operation 68 performs the final determination of the presence of turbulence. This operation 68 is performed by comparing the variance to the threshold and the total power to a threshold. The threshold compare operation is illustrated on page 6 of the Appendix where inputs to the threshold compare are the array of summed powers from the azimuth PDI, the variance vector from the frequency variance calculation and the variance threshold from the threshold calculation operation. The output from the threshold compare is a single bit for each range gate declaring whether turbulence was detected in that range gate, where a value of 1 indicates turbulence.

The final operation performed by the present invention is map blending 70 which is essentially multiplexing the turbulence array with the weather map array to combine the turbulence data overlay with the weather map that was produced simultaneously. The operation of this step is illustrated in detail on page 6 of the Appendix. The first operation involves lining up, in time, the weather and the turbulence data. This is necessary because the weather and turbulence processes can use different amounts of azimuth PDI. As a result, the two data sources will be misaligned in azimuth. To perform this alignment the turbulence data is delayed 72 for one or more coherent processing intervals, depending upon the different PDI's, before blending or multiplexing 74 with the map data. Once the alignment is performed the operation essentially involves replacing the map video data with the turbulence intensity code, which commonly is a code for the color magenta, for each range cell where the turbulence bit is set. Output from the map blending operation is a weather map that includes intensities or color commands for the turbulence overlay.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Appendix

```
Saturation detect the data samples.
   DO isamp=0.NRG*NSAMP-1
      DO ipp=0.NIPPL-1
         idata(isamp.ipp)=iqdata(isamp.ipp.i)
         qdata(isamp.ipp)=iqdata(isamp.ipp.q)
         IF (ABS(idata(isamp.ipp).GT.sat_thr)) THEN
            sat0(isamp.ipp)=1
         ELSE
            sat0(isamp.ipp)=0
         END IF
         IF (ABS(qdata(isamp.ipp).GT.sat_thr)) THEN
            sat0(isamp.ipp)=1
         END IF
      END DO
   END DO.
Perform range summing.
   DO irg=0.NRG-1
      DO ipp=0.NIPPL-1
         ippiq(irg.ipp.i)=idata(irg*NSAMP.ipp)
         ippiq(irg.ipp.q)=qdata(irg*NSAMP.ipp)
         sat1(irg.ipp)=sat0(irg*NSAMP.ipp)
         IF (NSAMP.NE.1) THEN
            DO isamp=1.NSAMP-1
               ippiq(irg.ipp.i)=ippiq(irg.ipp.i)
                  +idata(irg*NSAMP+isamp.ipp)
               ippiq(irg.ipp.q)=ippiq(irg.ipp.q)
                  +qdata(irg*NSAMP+isamp.ipp)
               sat1(irg.ipp)=sat1(irg.ipp)
                  OR sat0(irg*NSAMP+isamp.ipp)
            END DO
         END IF
      END DO
   END DO.
processing for threshold detect
   threshold=snrat*noise_gain
   DO ifilt=0.7
      DO irg=0.NRG-1
         IF ((fftamp(irg.ifilt).LT.threshold)
            OR (sat(irg.ifilt).EQ.1)) THEN
            edamp(irg.ifilt)=0
         ELSE
            edamp(irg.ifilt)=fftamp(irg.ifilt)
         END IF
      END DO
   END IF
processing for Doppler Statistics
      NOTE: This can be pre-calculated!
"
   DO ifilt=0.7
      IF (ifilt.LE.4) THEN
         freq(ifilt)=128*i
      ELSE
         freq(ifilt)=128*(i-8).
      END IF
   END DO
"
      Now. loop over range gates
"
   DO irg=0.NRG-1
      sum_x(irg)=fftamp(irg.0)
      sum_ax(irg)=0
      sum_ax2(irg)=0
      DO ifilt=1.7
         sum_x(irg)=sum_x(irg)+fftamp(irg.ifilt)
         ax=freq(ifilt)*fftamp(irg.ifilt)
         sum_ax(irg)=sum_ax(irg)+ax
         sum_ax2(irg)=sum_ax(irg)+ax**2
      END DO
processing for range PDI processing
   sum_x_r=0
   sum_ax_r=0
   sum_ax2_r=0
   DO irg=0.range_pdi-2
      sum_x_r=sum_x_r+sum_x(irg)
      sum_ax_r=sum_ax_r+sum_ax(irg)
      sum_ax2_r=sum_ax2_r+sum_ax2(irg)
   END DO
   DO irg=range_pdi-1.NRG-1
      sum_x_r=sum_x_r+sum_x(irg)
      sum_ax_r=sum_ax_r+sum_ax(irg)
      sum_ax2_r=sum_ax2_r+sum_ax2(irg)
      rsum_x(irg)=sum_x_r
      rsum_ax(irg)=sum_ax_r
      rsum_ax2(irg)=sum_ax2_r
      sum_x_r=sum_x_r-sum_x(irg+1-range_pdi)
      sum_ax_r=sum_ax_r-sum_ax(irg+1-range_pdi)
      sum_ax2_r=sum_ax2_r-sum_ax2(irg+1-range_pdi)
   END DO.
azimuth PDI processing
"
   At the beginning of a bar, the PDI must be initialized.
"
   IF (initialization) THEN
      cpi_counter=0
      DO irg=0.NRG+1-range_pdi
         DO ipdi=0.az_pdi-1
            psum_x(irg.ipdi)=0
            psum_ax(irg.ipdi)=0
            psum_ax2(irg.ipdi)=0
         END DO
         asum_x(irg)=0
         asum_ax(irg)=0
         asum_ax2(irg)=0
      END DO
   ELSE " Active Processing "
"
      First, determine new pointer into the PDI array
"
      pdi_in=MOD(cpi_counter.az_pdi)
      DO irg=0.NRG+1-range_pdi
         asum_x(irg)=asum_x(irg)-psum_x(irg.pdi_in)
         asum_ax(irg)=asum_ax(irg)-psum_ax(irg.pdi_in)
         asum_ax2(irg)=asum_ax2(irg)-psum_ax2(irg.pdi_in)
         psum_x(irg.pdi_in)=rsum_x(irg)
         psum_ax(irg.pdi_in)=rsum_ax(irg)
         psum_ax2(irg.pdi_in)=rsun_ax2(irg)
         asum_x(irg)=asum_x(irg)+psum_x(irg.pdi_in)
         asum_ax(irg)=asum_ax(irg)+psum_ax(irg.pdi_in)
         asum_ax2(irg)=asum_ax2(irg)+psum_ax2(irg.pdi_in)
      END DO
      cpi_counter=cpi_counter+1
   END IF.
frequency variance is calculated as follows
   DO irg=0.NRG+1-range_pdi
      varx(irg)=(asum_ax2(irg)-asum_ax(irg)**2)
   END DO.
processing steps to determine the turbulence threshold are as
follows:
a) Estimate the variance of the return due to doppler beamwidth:
      $v_{dop} = r/(\lambda^2) \cdot (V \cdot \delta \cdot \sin\theta)^2 \cdot 4/(prf^2)$
b) Estimate the variance of the return due to 5 m/sec turbulence:
      $v_{tur} = r/(\lambda^2) \cdot 16^2 \cdot 4/(prf^2)$
c) Chose the variance threshold
      IF ($v_{dop}$ < no_turb_thres) THEN
         $v = v_{dop} + v_{tur}$
         IF (v > max_thres) THEN
            v = max_thres
         END IF
      ELSE
         v = 0.04
      END IF
d) Now scale for use by the signal processor:
      var_thres = 128.0 · v.
threshold compare
a) Calculate the signal level threshold:
      sig_threshold = 2*snrat*noise_gain*range_pdi*az_pdi
b) Perform the testing
      DO irg=0.NRG+1-range_pdi
         IF ((asum_x(irg).GT.sig_threshold).AND.
            varx(irg.GT.var_thres*asum_x(irg)) THEN
            t_here(irg)=1
         ELSE
            t_here(irg)=0
         END IF
      END DO.
processing for map blending is as follows:
      DO irg=0.nrg-1
         IF ((irg.LT.range_psi/2).OR.
            irg.GT.nrg-range_psi/2) THEN
            video_out(irg)=map_intn(irg)
         ELSE
            IF (t_here(irg-range_pdi/2)) THEN
               video_out(irg)=magenta
```

| Appendix |
| --- |
| ELSE |
|     video_out(irg)=map_intn(irg) |
| END IF |
| END IF |
| END DO. |

What is claimed is:

1. A method of radar turbulence detection, comprising:

(a) obtaining a spectrum of a range cell radar return by performing a Fast Fourier Transformer on said radar return;

(b) determining a statistic of the spectrum;

(c) comparing the statistic to a threshold; and (d) indicating turbulence when the statistic exceeds the threshold.

2. A method as recited in claim 1, further comprising, prior to step (b) and subsequent to step (a) performing range and azimuth post detection integration.

3. A method as recited in claim 1, wherein step (d) includes indicating the turbulence on a weather map display.

4. The method as recited in claim 1, wherein step (c) comprises comparing the statistic to a defined threshold value having a spectrum spread of about 5 meters per second.

5. A radar turbulence system, comprising:

means for producing a spectrum from a radar range cell return by performing a Fast Fourier Transformer on said radar range cell return;

means for comparing a standard deviation of said produced spectrum with a threshold and for indicating turbulence when the threshold is exceeded; and means for displaying the turbulence indication.

6. A system as recited in claim 5, further comprising integration means for performing range and azimuth post detection integration.

* * * * *